United States Patent Office 2,869,672
Patented Jan. 20, 1959

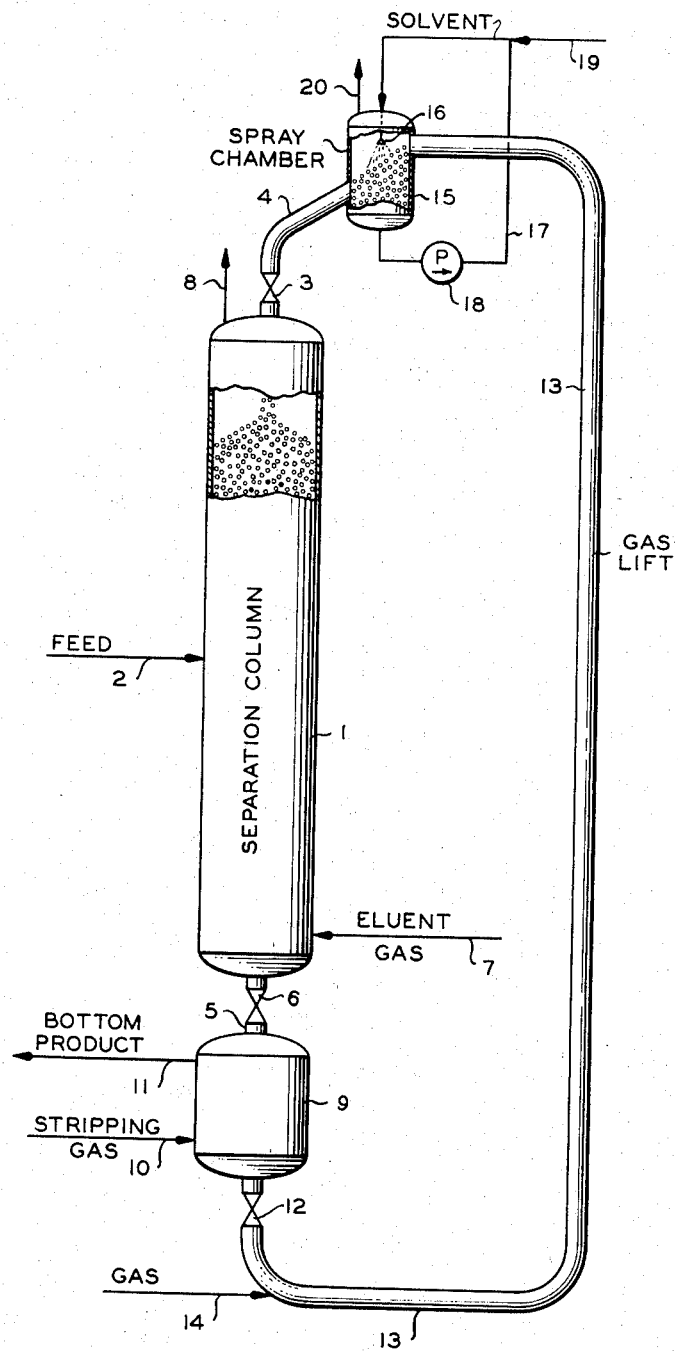

2,869,672

CONTINUOUS GAS ABSORPTION PROCESS AND APPARATUS

Robert A. Findlay, Bartlesville, Okla., assignor to Phillips Petroleum Company, a corporation of Delaware Application September 6, 1957, Serial No. 682,466

6 Claims. (Cl. 183—2)

This invention relates to separation of closely boiling materials. In one of its aspects, this invention relates to a continuous gas-liquid chromatography method. In still another aspect, this invention relates to the recovery of a hydrocarbon in high purity from an admixture of same with closely boiling materials.

Continuous separating methods based on selective solubility are well known to the art, however, with most of these methods, only one component of a two component system is generally obtainable in substantially pure state. Gas-liquid chromatography methods have recently been developed as laboratory techniques for making highly efficient separations of closely boiling components. However, such systems are batch processes and are not particularly suited to commercial separations. I have now found that such a gas-liquid chromatography method can be made continuous and that both components of a two component system can be recovered as relatively high purity product. Where a feed comprises several components, two or more components will be treated together as a single component. That is, the separation is such that there is very little contamination of the overhead and bottoms product with the other.

It is, therefore, an object of this invention to provide a method of separating closely boiling components of a mixture into two fractions of high purity. It is another object of this invention to provide a continuous gas-liquid chromatography method. Other objects, features and advantages of this invention will be obvious to those skilled in the art having been given this disclosure.

According to this invention, material to be separated is fed in vapor phase into a column of moving spheres which are coated with a thin film of a non-volatile, viscous selective solvent while an eluent gas passes countercurrent to said moving spheres.

Separation by gas-liquid chromatography methods is dependent upon relative velocities or retention time of the components. The relative velocities will be primarily dependent upon the particular solvent. That is the solvent will tend to hold the components while an eluent gas admitted to the column will tend to sweep the components out of the column. The result is that the components travel through the column at different rates of speed, depending on their affinities for the absorbent. Therefore, by the proper selection of solvent, any desired separation can be made.

In the practice of this invention, a sphere velocity, i. e., rate the spheres are withdrawn from the column, is selected to be intermediate the velocities of the components being separated so that the component of the greatest velocity moving faster than the spheres is swept out of the column with the eluent gas whereas the lower velocity material must remain with the spheres.

As has been indicated, a wide variety of materials can be separated by the process of this invention. I have found the invention to be particularly suited to preparation of highly purity hydrocarbons. However, the invention is also applicable for the separation of alcohols, esters, ethers, ketones, halogenated hydrocarbons, hydrocarbon isomers, flavoring extracts, perfumes and many other separations. Specific examples of separations include gasoline into its various components, cyclohexane from benzene, 2,4-dimethylpentane from cyclohexane or benzene, 3-methylpentane from 2-methylpentane, 2,3-dimethylbutane from 2-methylpentane and the like, ethyl alcohol from isopropyl alcohol, n-propyl alcohol from sec-butyl alcohol, isobutyl alcohol from amyl alcohol and the like, methyl ethyl acetone from methyl isobutyl ketone, ethylacetate from methylpropionate, propyl acetate from methyl butyrate, and many other such close boiling separations, the number being as varied as there are mixtures. While the method is particularly applicable to separation of close boiling components, the method is applicable to making other separations. The feed is introduced into the column at a temperature above the boiling point of the feed.

The liquid selective absorbent is almost as varied as are the mixtures which can be separated. The absorbent liquid should be non-reactive with the components being separated, should be non-volatile under the operating conditions of the column and should have a higher affinity for one component than for the other. It will be obvious to those skilled in the art that where a mixture comprises a plurality of components, that such a mixture can be separated by making a plurality of separations. In some cases, different absorbents will be employed on different fractions whereas different sphere velocities may be all that is required in other cases. Where a multiple component system is being separated, the two fractions separated are relatively free of components from the other fractions and can be considered as two component systems for each separation. Examples of suitable absorbent liquids include silicone oils, heavy mineral oils, and various selective solvents such as triethylamine and dioctyl phthalate.

The spheres useful in this invention are preferably non-porous inert spheres such as metal or ceramic spheres. Such spheres can be solid or hollow as desired. In later described embodiment, the spheres are hollow so as to minimize weight since a gas lift is employed for elevating the spheres. These spheres are preferably of a diameter in the range 1/32 to 1/8 inch. The small diameters employed provide large surface area for the solvent and prevent channeling of the gases across the diameter of the column. In general, I do not prefer to use porous spheres such as cracking catalyst, and the like, however, it is within the scope of the invention to employ same.

The eluent gas should be non-reactive with any of the components being separated or with the selective absorbent. Examples of inert eluent gases include steam, air, nitrogen, helium, hydrogen, argon, carbon dioxide and the like. It will be obvious that some of these gases will be reactive with certain components of mixtures and therefore will be avoided for such separations.

It is within the skill of the art to select the proper selective absorbent and diluent gases, sphere velocities, etc. for a given separation. Much data on selective solvents, relative velocities and the like is available to the art and by simple experimentation such data is readily obtainable. My invention is directed to a particular continuous method comprising precoating spheres with a selective adsorbent, passing the spheres countercurrent to an eluent gas and contacting the countercurrent moving streams with feed to be separated.

My invention can best be described by referring to the drawing which is a schematic representation of a preferred embodiment of this invention.

Referring now to the drawing, a feed stream comprising the components to be separated is fed to column 1 via conduit 2 intermediate the column ends. Pebbles coated with a selective absorbent are admitted to column 1 via star valve 3 and conduit 4, these pebbles continuously move through the column and are removed via conduit 5 and star valve 6. Eluent gas is admitted to column 1 via conduit 7 and passes countercurrent to the spheres. The eluent gas is removed via conduit 8. As the feed contacts the moving bed of spheres coated with absorbent and the eluent gas, the components of the feed will have their individual velocities through the column depending upon their individual affinities for the absorbent. The velocity of the spheres is controlled by the speed of the star valves to be intermediate the velocities of the components being separated. Therefore the higher velocity component will pass out of the column via conduit 8 with the eluent gas whereas the lower velocity component will be carried out absorbed on the surface of the spheres.

The eluent gas and the high velocity component are then passed via conduit 8 to a separation zone, not shown, where the product is recovered and the eluent gas can be recycled. The coated spheres pass to recovery zone 9 where they pass countercurrent to a stripping gas such as high temperature steam which is admitted to zone 9 via conduit 10. This stripping gas, along with bottom product and possibly some absorbent pass via conduit 11 to a separation zone, not shown, where the product is recovered. The spheres are removed from zone 9 via star valve 12 and conduit 13 where they are picked up via lift gas from conduit 14 and are conveyed to spray chamber 15. The lift gas is separated from the spheres and removed from chamber 15 via conduit 20. This gas can be recycled if desired. The selective absorbent is continuously sprayed into chamber 15 via nozzle 16. The excess solvent is removed from chamber 15 via conduit 17 and is pumped back to nozzle 16 via pump 18. Makeup solvent is added via conduit 19. The coated spheres are now ready for the next cycle to column 1.

While I have illustrated my invention in a preferred embodiment, those skilled in the art will immediately see many modifications which can be made. For example, instead of employing a gas lift, bucket conveyor, screw conveyors or the like can be employed. The spray chamber can be located anywhere along the recycle conduit and in the case of bucket conveyors, for example, the spheres would preferably be sprayed near the outlet of the product recovery chamber 9 and be given time to drain during the elevation period. Star valves are shown for admitting and removing spheres from various chambers. Other solids conveying means can be employed. Star valves are particularly advantageous since they will pass solids and prevent pressure losses, e. g., prevent eluent gas from entering the solvent spray chamber 15.

In the case of separating multiple component systems, the product recovered from conduit 8 or conduit 11 or both can be further treated as desired, for example, in a second column of the type described. It is also within the scope of this invention to remove any side streams as desired.

To further illustrate my invention, the following specific embodiments are described. The column is a ten foot column of 6 inches diameter. The column is similar to that shown in the drawing and nitrogen is employed as the gas lift.

*Example I*

A feed comprising 30% cyclohexane (boiling point 80.84) and 70% benzene (boiling point 80.12) is fed at 85° C. and 225 cc./min. to the mid point of the column which operates at 85° C. and atmospheric pressure. Firebrick spheres of 1/16" diameter and coated with dioctylphthalate are fed into the top of the column so as to provide a velocity of 0.148 ft./min. Hydrogen is fed into the column as eluent gas countercurrent to the coated firebrick at 10 cubic feet per minute. The retention time for cyclohexane under these conditions is 55 minutes or a relative velocity of 0.182 ft./min. whereas the retention time for benzene is 87 minutes or a relative velocity of 0.115 ft./min. The two components are recovered in a purity range of 95 to 100%.

*Example II*

This sample is the same as Example I except the benzene comprises 30 percent of the feed and cyclohexane comprises 70 percent of the feed. The spheres are 1/16 inch hollow brass spheres and the eluent gas is helium. The same high degree of separation is obtained.

*Example III*

A feed consisting of 2,4-dimethylpentane, cyclohexane and benzene is fed at a rate of 225 cc./min. to the mid point of the column of Example I at 85° C., the column also operating at 85° C. and atmospheric pressure. Data on the feed are shown below:

| Component | B. P. °C. | Retention Time (Min.) | Relative Vel., Ft./Min. | Percent in Feed | Purity of Sep. Component |
|---|---|---|---|---|---|
| 2,4-dimethylpentane | 80.6 | 36 | 0.277 | 50 | 95–100 |
| Cyclohexane | 80.8 | 55 | 0.182 | 25 | (50–50) |
| Benzene | 80.1 | 87 | 0.115 | 25 | Mix. |

Using the same solvent, spheres and eluent as employed in Example I, a sphere velocity of 0.239 ft./min. is employed. The cyclohexane-benzene mixture can be separated as shown in Example I.

In all of the examples above, the eluent gas and high velocity product are readily separated by condensing the hydrocarbon. The low velocity product is recovered from solvent by stripping with steam and subsequently condensing the steam.

The temperatures, pressures, velocities are illustrative only and are not to be considered limiting.

I claim:

1. A separation method comprising introducing a feed mixture comprising a plurality of components in vapor phase to a countercurrent moving stream of an eluent gas and spheres coated with a liquid absorbent having a greater affinity for at least one of said components than for another of said components, removing eluent gas along with components having lesser affinity for said absorbent from one end of said column and removing said spheres coated with said absorbent and having absorbed therein said component of greater affinity from the other end of said column.

2. A method for separating components of a feed mixture into two fractions which comprises introducing said feed into a vertical column, precoating a plurality of spheres with a liquid absorbent having greater affinity for at least one component of said feed than for another component of said feed, passing the thus coated spheres downward through said column, introducing an eluent gas into bottom of said column and passing same upward countercurrent to said spheres, regulating the velocity of said spheres passing through said column intermediate the relative velocity of said components, withdrawing eluent gas and component of relatively high velocity from top of said column and withdrawing coated spheres and components of relatively low velocity from bottom of said columns.

3. The process of claim 2 wherein the component having high affinity for the absorbent and the component having low affinity for said absorbent are relatively close boiling materials.

4. A method of separating close boiling hydrocarbon mixture which comprises coating relatively non-porous spheres with a solvent selective for at least one of said hydrocarbons which remains liquid under the operating conditions, introducing the thus treated spheres to an upper level of a contacting zone, passing said spheres downward through said zone, introducing an inert gas to a lower level of said zone, passing said gas upward through said zone, introducing said hydrocarbon in vaporous state into said contacting zone intermediate the upper and lower levels thereof, regulating the velocity of said spheres passing through said zone intermediate the velocities of the hydrocarbons being separated, withdrawing eluent gas and the high velocity hydrocarbon from upper level of said zone, recovering the hydrocarbon from eluent gas thus withdrawn, passing the coated spheres and low velocity hydrocarbons to a stripping zone, stripping hydrocarbon from said spheres in said stripping zone and recovering same, elevating the stripped spheres to top of said contacting zone, and coating said spheres for recycling.

5. The method of claim 4 wherein said elevating of said spheres comprises lifting said spheres with a gas.

6. An apparatus for separating multicomponent feeds which comprises in combination, a vertical contacting chamber, means for introducing spheres to an upper level in said chamber, means for withdrawing spheres from a lower level of said chamber, means for introducing a gaseous feed to said chamber intermediate said upper level and said lower level, means for introducing an eluent gas to said chamber at a level below said feed introducing means, means for withdrawing gas from said chamber above said means for introducing feed, a stripping chamber, means for introducing spheres withdrawn from said contacting chamber to said stripping chamber, means for introducing a stripping gas to said stripping chamber, means for withdrawing gas from said stripping chamber, means for withdrawing spheres from said stripping chamber, means for coating last said withdrawn spheres with a liquid, and means for passing said coated spheres to said means for introducing spheres to said contacting chamber.

References Cited in the file of this patent

UNITED STATES PATENTS 2,519,873     Berg                   Aug. 22, 1950

OTHER REFERENCES

"Gas Chromatogprahy Growing," Chemical and Engineering News, April 9, 1956, pages 1692 to 1696.